(12) United States Patent
Sakamoto

(10) Patent No.: US 11,664,002 B2
(45) Date of Patent: May 30, 2023

(54) ACTIVE NOISE CONTROL DEVICE AND VEHICLE

(71) Applicant: HONDA MOTOR CO., LTD., Tokyo (JP)

(72) Inventor: Kosuke Sakamoto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/578,530

(22) Filed: Jan. 19, 2022

(65) Prior Publication Data

US 2022/0230619 A1 Jul. 21, 2022

(30) Foreign Application Priority Data

Jan. 20, 2021 (JP) ............................. JP2021-007125

(51) Int. Cl.
 *G10K 11/178* (2006.01)
 *B60W 50/02* (2012.01)
 *B60W 50/14* (2020.01)

(52) U.S. Cl.
 CPC ... *G10K 11/17854* (2018.01); *B60W 50/0205* (2013.01); *B60W 50/14* (2013.01); *G10K 11/1783* (2018.01); *G10K 11/17823* (2018.01); *G10K 11/17825* (2018.01); *G10K 11/17881* (2018.01); *B60W 2050/021* (2013.01); *B60W 2050/146* (2013.01); *B60W 2420/54* (2013.01); *G10K 2210/1282* (2013.01); *G10K 2210/3026* (2013.01); *G10K 2210/3027* (2013.01); *G10K 2210/3028* (2013.01)

(58) Field of Classification Search
 CPC ........... G10K 11/178; G10K 2210/128; G10K 2210/1282; G10K 2210/503
 See application file for complete search history.

(56) References Cited

U.S. PATENT DOCUMENTS 10,134,380 B2 * 11/2018 Zafeiropoulos ......... G01P 15/18
2017/0352201 A1    12/2017 Kumabe
2020/0074977 A1 *  3/2020 Bernstein ......... G10K 11/17883

FOREIGN PATENT DOCUMENTS

| JP | H06-059688 A | 3/1994 |
| JP | 2007-308107 A | 11/2007 |
| JP | 2016-128985 A | 7/2016 |

* cited by examiner

*Primary Examiner* — Kile O Blair
(74) *Attorney, Agent, or Firm* — Carrier Shende & Associates, P.C.; Joseph P. Carrier; Fulchand P. Shende

(57) ABSTRACT

An active noise control device includes a determination unit configured to determine whether an abnormality has occurred in an acceleration sensor based on a direct-current component of a reference signal acquired by the acceleration sensor attached to a vehicle, and a control unit configured to, when the determination unit determines that an abnormality has occurred in any of a plurality of the acceleration sensors, stop generation of the control signal based on the reference signal acquired by the acceleration sensor that has been determined to have the abnormality, and stop updating a filter coefficient of an adaptive filter configured to perform the filtering process on the reference signal acquired by the acceleration sensor that has been determined to have no abnormality.

8 Claims, 7 Drawing Sheets

ACTIVE NOISE CONTROL DEVICE AND VEHICLE

CROSS-REFERENCE TO RELATED APPLICATIONS

This application is based upon and claims the benefit of priority from Japanese Patent Application No. 2021-007125 filed on Jan. 20, 2021, the contents of which are incorporated herein by reference.

BACKGROUND OF THE INVENTION

Field of the Invention

The present invention relates to an active noise control device and a vehicle.

Description of the Related Art

JP H06-059688 A discloses an active noise canceling device. The active noise canceling device disclosed in JP H06-059688 A includes a sound generating device, a sound detection sensor, and a vibration sensor. The sound generating device is disposed in a space where noise is to be canceled. The sound detection sensor is disposed in the space where noise is to be canceled. The vibration sensor is provided for each of a plurality of vibration sources of several vibrations propagating in the space where noise is to be canceled. The active noise canceling device disclosed in JP H06-059688 A further includes a vibration signal generating means and a driving means. The vibration signal generating means generates a vibration signal having an opposite phase to the sound detected by the sound detection sensor, based on the output signals of the plurality of vibration sensors. The driving means drives the sound generating device based on the vibration signal.

SUMMARY OF THE INVENTION

However, in JP H06-059688 A, when an abnormality occurs in any of the plurality of vibration sensors, noise cannot be suitably reduced.

An object of the present invention is to provide an active noise control device and a vehicle that can reduce noise suitably.

An active noise control device according to an aspect of the present invention causes an actuator to output a canceling sound based on a control signal in order to reduce noise in a vehicle compartment of a vehicle. The active noise control device includes an adaptive filter configured to generate the control signal by performing a filtering process on a reference signal acquired by an acceleration sensor attached to the vehicle, a filter coefficient updating unit configured to update a filter coefficient of the adaptive filter based on the reference signal and an error signal acquired by detecting residual noise due to interference between the noise and the canceling sound by a microphone, a determination unit configured to determine whether an abnormality has occurred in the acceleration sensor based on a direct-current component of the reference signal, and a control unit configured to, when the determination unit determines that an abnormality has occurred in any of a plurality of the acceleration sensors, stop generation of the control signal based on the reference signal acquired by the acceleration sensor that has been determined to have the abnormality, and stop updating the filter coefficient of the adaptive filter configured to perform the filtering process on the reference signal acquired by the acceleration sensor that has been determined to have no abnormality.

A vehicle according to another aspect of the present invention includes the active noise control device as described above.

According to the present invention, it is possible to provide an active noise control device and a vehicle which can reduce noise suitably.

The above and other objects, features, and advantages of the present invention will become more apparent from the following description when taken in conjunction with the accompanying drawings in which a preferred embodiment of the present invention is illustrated by way of illustrative example.

DESCRIPTION OF THE INVENTION

Preferred embodiments of an active noise control device and a vehicle according to the present invention will be described in detail below with reference to the accompanying drawings.

Embodiment

Figure 1:
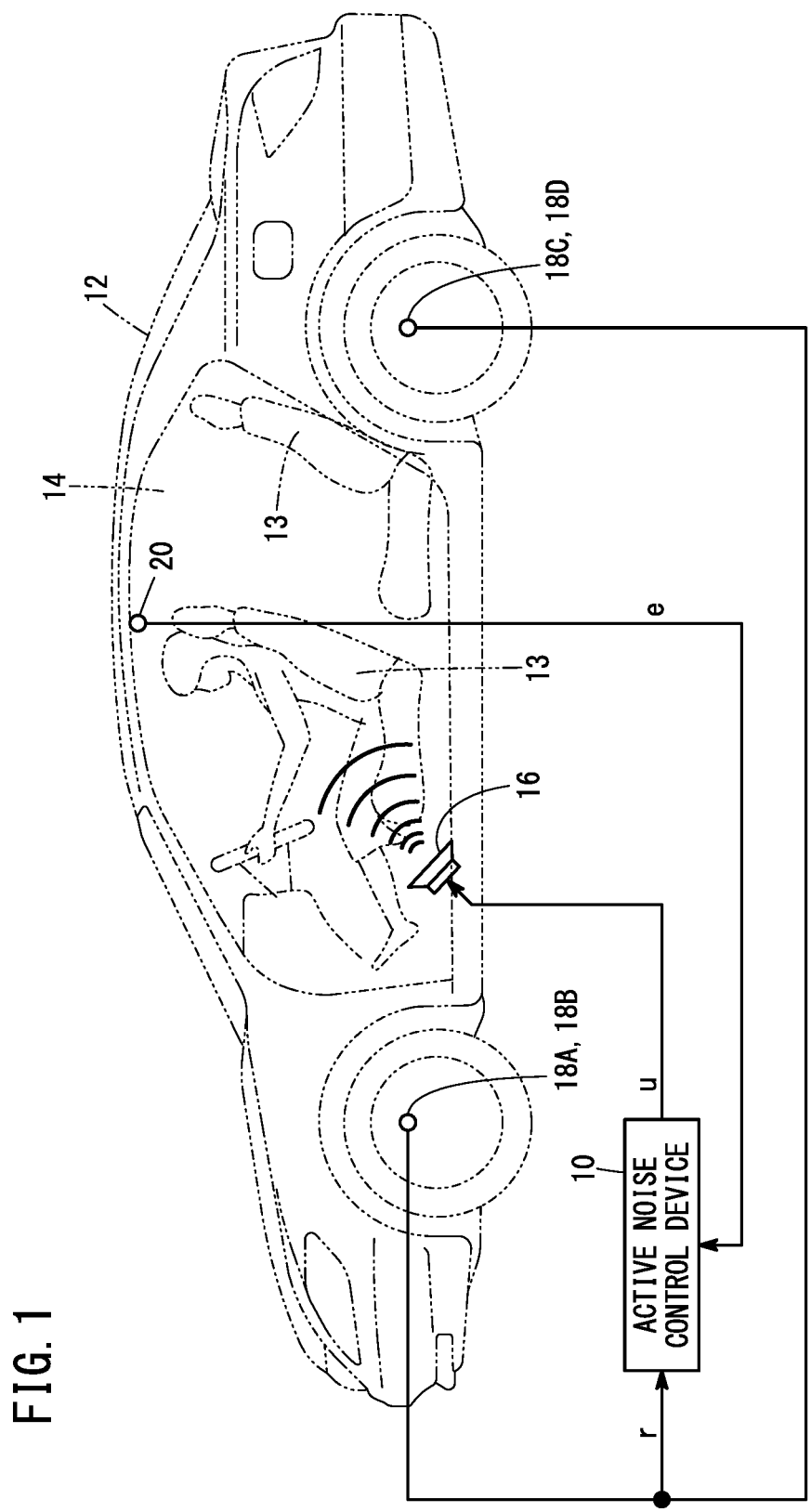
FIG. 1 is a diagram illustrating an outline of active noise control.

An active noise control device and a vehicle according to an embodiment will be described with reference to FIGS. 1 to 7. FIG. 1 is a diagram illustrating an outline of active noise control.

An active noise control device 10 causes an actuator 16 to output a canceling sound for reducing noise (vibration noise) in a vehicle compartment 14 of a vehicle 12.

The noise in the vehicle compartment 14 may include, for example, road noise. Road noise is noise that is transmitted to an occupant in the vehicle compartment 14 when a wheel vibrates due to force received from the road surface and the vibration of the wheel is transmitted to the vehicle body via a suspension.

The vehicle 12 is provided with a plurality of vibration sensors that detect vibration of the vehicle 12. That is, the vehicle 12 is provided with a plurality of acceleration sensors 18A to 18D. The reference character 18 is used when describing the acceleration sensor in general. The reference characters 18A to 18D are used when describing the individual acceleration sensors. Signals r detected by the acceleration sensors 18A to 18D are supplied to the active noise control device 10. That is, a signal indicating vibration is supplied to the active noise control device 10.

A microphone 20 is further provided in the vehicle compartment 14. The microphone 20 detects residual noise (cancellation error noise) due to interference between the noise and the canceling sound output from the actuator 16. The residual noise detected by the microphone 20 is supplied to the active noise control device 10. That is, an error signal e detected by the microphone 20 is supplied to the active noise control device 10.

The active noise control device 10 generates a control signal u for outputting a canceling sound from the actuator 16, based on the signal r detected by the acceleration sensor 18 and the error signal e detected by the microphone 20. More specifically, the active noise control device 10 generates the control signal u such that the error signal e detected by the microphone 20 is minimized. Since the actuator 16 outputs the canceling sound based on the control signal u that minimizes the error signal e detected by the microphone 20, the noise in the vehicle compartment 14 can be suitably canceled out by the canceling sound. In this way, the active noise control device 10 can reduce noise transmitted to an occupant in the vehicle compartment 14.

Incidentally, an abnormality may occur in any of the plurality of acceleration sensors 18. Examples of the abnormality of the acceleration sensor 18 may include the dropping off of the acceleration sensor 18, an abnormality in the characteristics of the acceleration sensor 18, and the like. The dropping off of the acceleration sensor 18 may occur, for example, when a portion to which a housing of the acceleration sensor 18 is attached deteriorates over time. The abnormality in the characteristics of the acceleration sensor 18 may occur, for example, when a detection unit of the acceleration sensor 18 is deteriorated due to vibration fatigue or the like. When the canceling sound is simply generated by using the signal r acquired by the acceleration sensor 18 in which the abnormality occurs, it is not always possible to suitably cancel out the noise in the vehicle compartment 14. As a result of intensive studies, the inventors of the present application have conceived the active noise control device 10 as described below.

Figure 2:
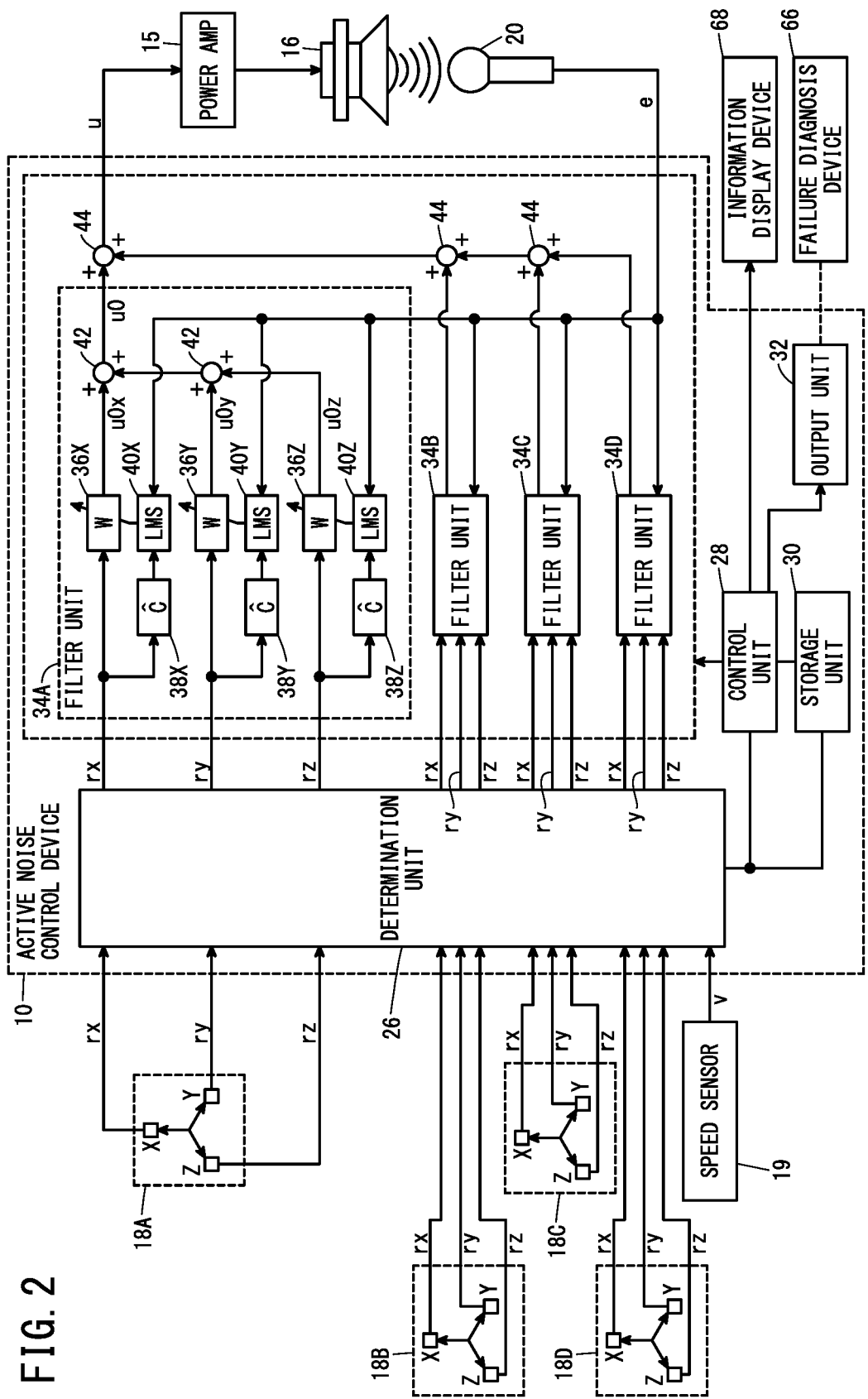
FIG. 2 is a block diagram illustrating a part of a vehicle equipped with an active noise control device according to an embodiment.

FIG. 2 is a block diagram illustrating a part of a vehicle equipped with an active noise control device according to the present embodiment.

As illustrated in FIG. 2, the active noise control device 10 includes a determination unit 26, a control unit 28, a storage unit 30, an output unit 32, filter units 34A to 34D, and computation units 44. The reference character 34 is used when describing the filter unit in general. The reference characters 34A to 34D are used when describing the individual filter units.

The active noise control device 10 includes a computation device (computational processing device) (not illustrated). The computation device may be configured by a processor such as a CPU (Central Processing Unit), a DSP (Digital Signal Processor), or the like. However, the present invention is not limited to this feature. A DDS (Direct Digital Synthesizer), a DCO (Digitally Controlled Oscillator), or the like can be included in the computation device. In addition, an ASIC (Application Specific Integrated Circuit), an FPGA (Field-Programmable Gate Array), or the like can be included in the computation device.

As described above, the active noise control device 10 includes the storage unit 30. The storage unit 30 may be configured by a volatile memory (not illustrated) and a nonvolatile memory (not illustrated). Examples of the volatile memory include, for example, a RAM or the like. Examples of the nonvolatile memory include, for example, a ROM, a flash memory, or the like. Data or the like may be stored, for example, in the volatile memory. Programs, tables, maps, and the like may be stored, for example, in the nonvolatile memory.

The determination unit 26, the control unit 28, the filter unit 34, and the computation unit 44 can be realized by programs, which are stored in the storage unit 30, being executed by the computation device. The output unit 32 may be configured by an output interface circuit or the like.

The vehicle 12 may be provided with the acceleration sensors 18A to 18D. Although the four acceleration sensors 18 are illustrated in FIG. 2, the number of acceleration sensors 18 is not limited to four. For example, a three-axis acceleration sensor can be used as the acceleration sensor 18. The three axes are the X-axis, the Y-axis and the Z-axis. The vibration in the X-axis direction detected by the acceleration sensor 18 is supplied to the active noise control device 10 as a reference signal rx. The vibration in the Y-axis direction detected by the acceleration sensor 18 is supplied to the active noise control device 10 as a reference signal ry. The vibration in the Z-axis direction detected by the acceleration sensor 18 is supplied to the active noise control device 10 as a reference signal rz. The reference character r is used when describing the reference signal in general. The reference characters rx, ry, and rz are used when describing the individual reference signals.

As described above, the microphone 20 that detects the residual noise due to interference between the noise and the canceling sound is provided in the vehicle compartment 14 (see FIG. 1). That is, the microphone 20 for detecting the error signal e is provided in the vehicle compartment 14.

As described above, the vehicle compartment 14 (see FIG. 1) is provided with the actuator 16 that outputs a canceling sound based on the control signal u. As examples of the actuator 16, there may be cited a speaker.

The filter unit 34 includes adaptive filters 36X, 36Y, and 36Z, acoustic characteristic filters 38X, 38Y, and 38Z, filter coefficient updating units 40X, 40Y, and 40Z, and computation units 42. The reference character 36 is used when describing the adaptive filter in general. The reference characters 36X, 36Y, and 36Z are used when describing the individual adaptive filters. The reference character 38 is used when describing the acoustic characteristic filter in general. The reference characters 38X, 38Y, and 38Z are used when describing the individual acoustic characteristic filters. The reference character 40 is used when describing the filter coefficient updating unit in general. The reference characters 40X, 40Y, and 40Z are used when describing each of the filter coefficient updating units.

The adaptive filter 36X generate a control signal u0$x$ by performing a filtering process on the reference signal rx. The adaptive filter 36Y generates a control signal u0$y$ by performing a filtering process on the reference signal ry. The adaptive filter 36Z generates a control signal u0$z$ by performing a filtering process on the reference signal rz. The reference character u0 is used when describing the control signal in general, whereas the reference characters u0$x$, u0$y$, and u0$z$ are used when describing the individual control signals. As the adaptive filter 36, for example, an FIR (Finite Impulse Response) filter or the like can be used, but the present invention is not limited to this feature. The filter coefficients of the adaptive filters 36X, 36Y, and 36Z are updated by filter coefficient updating units 40X, 40Y, and 40Z, as described later. The FIR filter generates the control signal u0 by performing a convolution operation on the reference signal r.

The acoustic characteristic filter 38X corrects the reference signal rx by performing a filtering process on the reference signal rx according to an acoustic characteristic (transfer characteristic) from the actuator 16 to the microphone 20. The acoustic characteristic filter 38Y corrects the reference signal ry by performing a filtering process on the reference signal ry according to an acoustic characteristic from the actuator 16 to the microphone 20. The acoustic characteristic filter 38Z corrects the reference signal rz by performing a filtering process on the reference signal rz according to an acoustic characteristic from the actuator 16 to the microphone 20. The acoustic characteristic from the actuator 16 to the microphone 20 is obtained in advance. That is, the transfer characteristic $\hat{C}$ from the actuator 16 to the microphone 20 is obtained in advance.

The filter coefficient updating unit 40X updates the filter coefficient W of the adaptive filter 36X based on the error signal e acquired by detecting the residual noise by the microphone 20 and the reference signal rx corrected by the acoustic characteristic filter 38X. More specifically, the filter coefficient updating unit 40X updates the filter coefficient W of the adaptive filter 36X such that the error signal e is minimized. The filter coefficient updating unit 40Y updates the filter coefficient W of the adaptive filter 36Y based on the error signals e and the reference signal ry corrected by the acoustic characteristic filter 38Y. More specifically, the filter coefficient updating unit 40Y updates the filter coefficient W of the adaptive filter 36Y such that the error signal e is minimized. The filter coefficient updating unit 40Z updates the filter coefficient W of the adaptive filter 36Z based on the error signal e and the reference signal rz corrected by the acoustic characteristic filter 38Z. More specifically, the filter coefficient updating unit 40Z updates the filter coefficient W of the adaptive filter 36Z such that the error signal e is minimized. When the filter coefficient W is updated, for example, a filtered-X LMS algorithm can be used, but the present invention is not limited to this feature.

The filter unit 34 further includes the computation units 42. The control signals u0x, u0y, and u0z output from the adaptive filters 36X, 36Y, and 36Z are input to the computation units 42. The computation units 42 add the control signals u0x, u0y, and u0z supplied from the adaptive filters 36X, 36Y, and 36Z. The computation units (adders) 42 output the control signal u0 generated by adding the plurality of control signals u0x, u0y, and u0z.

The control signals u0 output from the filter units 34A to 34D are input to the computation units 44. The computation units 44 add the control signals u0 supplied from the respective filter units 34A to 34D. The computation units (adders) 44 supply a control signal u generated by adding the plurality of control signals u0 to the actuator 16 via a power amplifier 15.

The determination unit (abnormality determination unit) 26 determines whether or not an abnormality occurs in the acceleration sensor 18 based on DC (direct-current) components of the reference signals rx, ry, and rz. The reason for determining whether or not an abnormality has occurred in the acceleration sensor 18 based on the DC component of the reference signal r, is as follows. That is, since the AC component includes many vibration components generated only at the portion where the acceleration sensor 18 is attached, it is not easy to determine whether or not an abnormality has occurred in the acceleration sensor 18 based on the AC component of the reference signal r. On the other hand, since the movement of the vehicle 12 is accurately reflected in the DC component, it is relatively easy to determine whether or not an abnormality has occurred in the acceleration sensor 18 based on the DC component of the reference signal r. The gravitational acceleration (acceleration in the vertical direction), which is an important factor, is also a DC component. For this reason, in the present embodiment, whether or not an abnormality has occurred in the acceleration sensor 18 is determined based on the DC component of the reference signal r.

Figure 3:
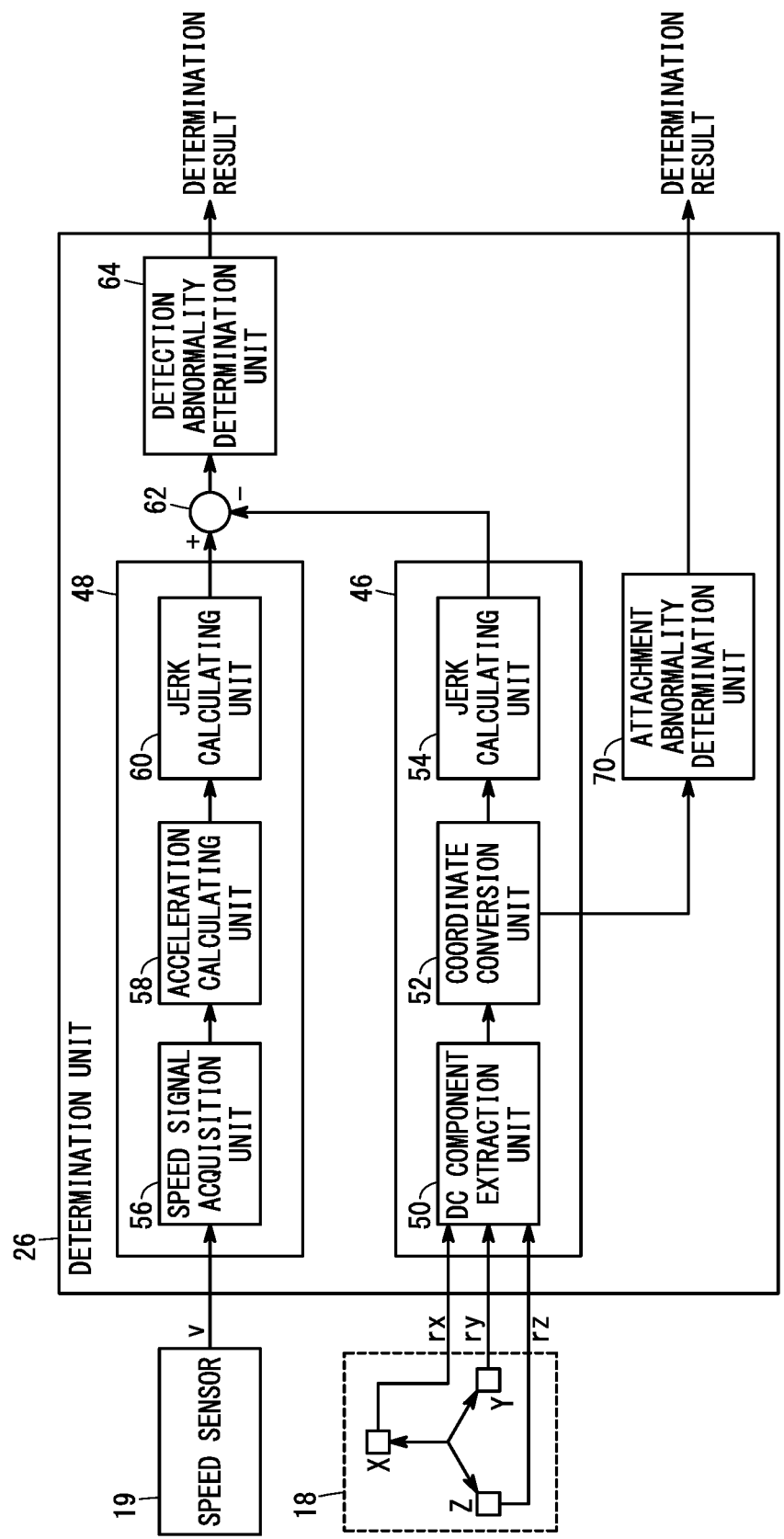
FIG. 3 is a diagram illustrating an example of a configuration of a determination unit.

FIG. 3 is a diagram illustrating an example of a configuration of a determination unit. As illustrated in FIG. 3, the determination unit 26 includes a first calculating unit 46, a second calculating unit 48, a computation unit 62, a detection abnormality determination unit 64, and an attachment abnormality determination unit 70. Although only one first calculating unit 46 is illustrated in FIG. 3, the first calculating unit 46 is provided for each of the plurality of acceleration sensors 18. Although only one computation unit 62 is illustrated in FIG. 3, the computation unit 62 is also provided for each of the plurality of acceleration sensors 18. Although only one detection abnormality determination unit 64 is illustrated in FIG. 3, the detection abnormality determination unit 64 is also provided for each of the plurality of acceleration sensors 18. Although only one attachment abnormality determination unit 70 is illustrated in FIG. 3, the attachment abnormality determination unit 70 is also provided for each of the plurality of acceleration sensors 18.

The first calculating unit 46 includes a DC component extraction unit 50, a coordinate conversion unit 52, and a jerk calculating unit 54.

As described above, the vibration in the X-axis direction detected by the acceleration sensor 18 is supplied to the determination unit 26 as the reference signal rx. The DC component extraction unit 50 may extract a DC component from the reference signal rx and supply the extracted DC component to the coordinate conversion unit 52. As described above, the vibration in the Y-axis direction detected by the acceleration sensor 18 is supplied to the determination unit 26 as the reference signal ry. The DC component extraction unit 50 extracts a DC component from the reference signal ry and supplies the extracted DC component to the coordinate conversion unit 52. As described above, the vibration in the Z-axis direction detected by the acceleration sensor 18 is supplied to the determination unit 26 as the reference signal rz. The DC component extraction unit 50 extracts a DC component from the reference signal rz and supplies the extracted DC component to the coordinate conversion unit 52. As described above, the DC component extraction unit 50 can extract a DC component from each of the reference signals r of the three axes (X axis, Y axis, and Z axis) and supply each of the extracted DC components to the coordinate conversion unit 52.

The coordinate conversion unit 52 can perform a coordinate conversion process. Each of the X axis, the Y axis, and the Z axis of the acceleration sensor 18 does not necessarily coincide with each of the X axis, the Y axis, and the Z axis of the vehicle 12. For this reason, the coordinate conversion unit 52 performs the coordinate conversion process such that the magnitude of the DC component of the reference signal r of each of the three axes supplied from the DC component extraction unit 50 corresponds to the coordinate system of the vehicle 12.

Figure 4:
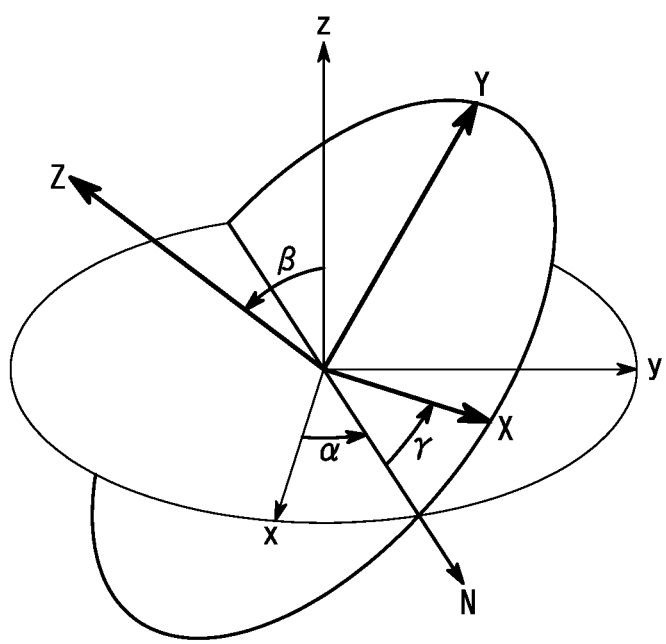
FIG. 4 is a diagram an example of a coordinate system.

The coordinate conversion process can be performed as follows, for example. FIG. 4 is a diagram illustrating an example of a coordinate system. In FIG. 4, the characters x, y, and z indicated a coordinate system in the acceleration sensor 18. The characters X, Y, and Z in FIG. 4 indicate a coordinate system in the vehicle 12.

The DC components of the reference signals rx, ry, and rz supplied from the acceleration sensor 18 are defined as asx, asy, and asz. That is, the accelerations in the coordinate system of the acceleration sensor 18 are defined as asx, asy, and asz. The character asx indicates an acceleration of the acceleration sensor 18 in the X-axis direction. The character asy indicated an acceleration in the Y-axis direction of the acceleration sensor 18. The character asz indicated an acceleration of the acceleration sensor 18 in the Z-axis direction. The DC components of the reference signals rx, ry, and rz when converted into the values in the coordinate system of the vehicle 12 are denoted by avx, avy, and avz. That is, the accelerations in the coordinate system of the vehicle 12 are defined as avx, avy, and avz. The character avx indicates an acceleration of the vehicle 12 in the X-axis direction. The character avy indicates an acceleration of the vehicle 12 in the Y-axis direction. The character avz indicates an acceleration of the vehicle 12 in the Z-axis direction. When the accelerations asx, asy, and asz in the coordinate system of the acceleration sensor 18 are converted into the accelerations avx, avy, and avz in the coordinate system of the vehicle 12, the following matrix operation can be performed. The character Av denotes an acceleration in the coordinate system of the vehicle 12. The character As denotes an acceleration in the coordinate system of the acceleration sensor 18. The character Rsv denotes a coordinate transformation matrix.

$$A_v = R_{sv} A_s$$

$$A_v = \begin{bmatrix} a_{vx} \\ a_{vy} \\ a_{vz} \end{bmatrix}, A_s = \begin{bmatrix} a_{sx} \\ a_{sy} \\ a_{sz} \end{bmatrix}, R_{sv} = \begin{bmatrix} r_{11} & r_{12} & r_{13} \\ r_{21} & r_{22} & r_{23} \\ r_{31} & r_{32} & r_{33} \end{bmatrix}$$

The coordinate transformation matrix Rsv can be expressed as follows. The character Rx denotes a matrix for performing X-axis rotation. The character Ry denotes a matrix for performing Y-axis rotation. The character Rz denotes a matrix for performing Z-axis rotation.

$$R_{sv} = R_z R_y R_x$$

$$R_x = \begin{bmatrix} \cos\alpha & 0 & \sin\alpha \\ 0 & 1 & 0 \\ -\sin\alpha & 0 & \cos\alpha \end{bmatrix}$$

$$R_y = \begin{bmatrix} 1 & 0 & 0 \\ 0 & \cos\beta & -\sin\beta \\ 0 & \sin\beta & \cos\beta \end{bmatrix}$$

$$R_z = \begin{bmatrix} \cos\gamma & -\sin\gamma & 0 \\ \sin\gamma & \cos\gamma & 0 \\ 0 & 0 & 1 \end{bmatrix}$$

In this way, the accelerations avx, avy, and avz corresponding to the coordinate system of the vehicle 12 are calculated by the coordinate conversion unit 52. The coordinate conversion unit 52 supplies a signal indicating the acceleration corresponding to the traveling direction of the vehicle 12 to the jerk calculating unit 54. Here, a case where the X-axis direction in the coordinate system of the vehicle 12 is the traveling direction of the vehicle 12 will be described as an example. The coordinate conversion unit 52 supplies a signal indicating the acceleration avx in the traveling direction of the vehicle 12 to the jerk calculating unit 54.

The coordinate conversion unit 52 supplies a signal indicating the acceleration of the vehicle 12 in the upper and lower directions to the attachment abnormality determination unit 70. That is, the coordinate conversion unit 52 supplies a signal indicating the acceleration in the vertical direction to the attachment abnormality determination unit 70. The vertical component of the DC component of the reference signal r is supplied to the attachment abnormality determination unit 70. Here, a case where the Z-axis direction in the coordinate system of the vehicle 12 is the vertical direction of the vehicle 12 will be described as an example. The coordinate conversion unit 52 supplies a signal indicating the acceleration avz in the vertical direction of the vehicle 12 to the attachment abnormality determination unit 70.

The jerk calculating unit 54 calculates a jerk jvx in the traveling direction of the vehicle 12 based on the signal supplied from the coordinate conversion unit 52. That is, the jerk calculating unit 54 calculates the jerk jvx in the traveling direction of the vehicle 12 based on the acceleration avx in the traveling direction of the vehicle 12. Such a jerk jvx can be acquired by calculating a change in acceleration per unit time.

The acceleration acquired last time is defined as avxb. The acceleration acquired this time is defined as avxn. The time from a timing at which the previous acceleration avxb was acquired to a timing at which the current acceleration avxn has been acquired is defined as Δt1. The jerk jvx is obtained by the following expression (1).

$$Jvx = (avxn - avxb)/\Delta t1 \tag{1}$$

Thus, based on the signal acquired by the acceleration sensor 18, the jerk jvx in the traveling direction of the vehicle 12 can be calculated by the first calculating unit 46. More specifically, the jerk jvx in the traveling direction of the vehicle 12 can be calculated by the first calculating unit 46 based on the DC component of the reference signal r.

The second calculating unit 48 includes a speed signal acquisition unit 56, an acceleration calculating unit 58, and a jerk calculating unit 60.

The speed signal acquisition unit 56 acquires a signal supplied from a speed sensor 19 provided at the vehicle 12. That is, the speed signal acquisition unit 56 acquires a signal indicating the speed v.

The acceleration calculating unit 58 calculates an acceleration "a" of the vehicle 12 based on the signal acquired by the speed signal acquisition unit 56. That is, the acceleration calculating unit 58 calculates the acceleration in the traveling direction of the vehicle 12 based on the signal indicating the speed v. Such an acceleration "a" can be acquired by calculating a change in speed per unit time.

The speed previously acquired by the speed signal acquisition unit 56 is denoted as vb. The speed currently acquired by the speed signal acquisition unit 56 is denoted as vn. The time from a timing at which the previous speed vb was acquired to a timing at which the current speed vn has been acquired is defined as Δt2. Then, the acceleration a is obtained by the following expression (2).

$$a = (vn - vb)/\Delta t2 \tag{2}$$

The jerk calculating unit 60 calculates a jerk j of the vehicle 12 based on the acceleration a calculated by the acceleration calculating unit 58. That is, the jerk calculating unit 60 calculates the jerk in the traveling direction of the vehicle 12 based on the acceleration a calculated by the acceleration calculating unit 58. The jerk j can be acquired by calculating a change in acceleration per unit time.

The acceleration calculated last time by the acceleration calculating unit 58 is defined as ab. The acceleration currently calculated by the acceleration calculating unit 58 is defined as an. The time from a timing at which the previous acceleration ab was acquired to a timing at which the current acceleration an has been acquired is defined as Δt3. Then, the jerk j is obtained by the following expression (3).

$$j=(an-ab)/\Delta t3 \tag{3}$$

In this manner, the jerk j in the traveling direction of the vehicle 12 is calculated by the second calculating unit 48 based on the signal acquired by the speed sensor 19 provided at the vehicle 12.

The computation unit 62 calculates a difference Δj between the jerk jvx calculated by the first calculating unit 46 and the jerk j calculated by the second calculating unit 48. The difference Δj is expressed by the following expression (4).

$$\Delta j=|jvx-j| \tag{4}$$

When the difference Δj between the jerk jvx calculated by the first calculating unit 46 and the jerk j calculated by the second calculating unit 48 is greater than or equal to a difference threshold value DTH, the detection abnormality determination unit 64 determines that an abnormality (detection abnormality) has occurred in the acceleration sensor 18. More specifically, the detection abnormality determination unit 64 determines that an abnormality (detection abnormality) has occurred in the acceleration sensor 18 when the difference Δj is greater than or equal to the difference threshold value DTH, and when a state in which the difference Δj is greater than or equal to the difference threshold value DTH continues for a period of a time threshold value TTH or longer. In the present embodiment, the reason why an abnormality of the acceleration sensor 18 is determined based not on the acceleration but on the jerk, is as follows. That is, in the case where the acceleration sensor 18 whose acceleration detection accuracy is relatively low is provided at the vehicle 12, it is not easy to determine whether or not an abnormality has occurred in the acceleration sensor 18 based on the acceleration detected by the acceleration sensor 18. On the other hand, in the case where whether or not an abnormality has occurred in the acceleration sensor 18 is determined based on the jerk, it is possible to suitably determine whether or not an abnormality has occurred in the acceleration sensor 18, even when the detection accuracy of the acceleration sensor 18 is relatively low. For this reason, in the present embodiment, whether or not an abnormality has occurred in the acceleration sensor 18 is determined, based on the jerk rather than the acceleration. The determination result of the detection abnormality determination unit 64 is supplied to the control unit 28.

As described above, the vertical component of the DC component of the reference signal r is supplied to the attachment abnormality determination unit 70. The positive or negative sign of the value of the vertical component of the DC component of the reference signal r differs between the case where the acceleration sensor 18 is properly attached to the vehicle 12 and the case where the acceleration sensor 18 is not properly attached to the vehicle 12. Here, an example is described of a case where a normal condition is defined as the vertical component of the DC component of the reference signal r being negative, and an abnormal condition is defined as the vertical component of the DC component of the reference signal r being positive.

In a case where there is an attachment abnormality, that is, an abnormality in which the acceleration sensor 18 is attached with its front side and back side being opposite to each other, a sound having the same phase as the noise is output from the actuator 16 as a canceling sound, which may cause an increase in the noise.

The attachment abnormality determination unit 70 determines whether or not an abnormality (attachment abnormality) has occurred in the acceleration sensor 18 based on the positive or negative sign of the vertical component of the DC component of the reference signal r. When the vertical component of the DC component of the reference signal r is negative, the attachment abnormality determination unit 70 determines that an abnormality (attachment abnormality) has not occurred in the acceleration sensor 18. On the other hand, when the vertical component of the DC component of the reference signal r is positive, the attachment abnormality determination unit 70 determines that an abnormality (attachment abnormality) has occurred in the acceleration sensor 18.

An example has been described of a case where a normal condition is defined as the vertical component of the DC component of the reference signal r being negative, and an abnormal condition is defined as the vertical component of the DC component of the reference signal r being positive. However, the present invention is not limited thereto. On the other hand, the normal condition may be defined as the vertical component of the DC component of the reference signal r being positive, and the abnormal condition may be defined as the vertical component of the DC component of the reference signal r being negative. In such a case, when the vertical component of the DC component of the reference signal r is positive, the attachment abnormality determination unit 70 determines that an attachment abnormality has not occurred in the acceleration sensor 18. On the other hand, when the vertical component of the DC component of the reference signal r is negative, the attachment abnormality determination unit 70 determines that an attachment abnormality has occurred in the acceleration sensor 18.

When the determination unit 26 determines that an abnormality has occurred in any of the plurality of acceleration sensors 18, the control unit 28 stops generating the control signal u0 based on the reference signal r acquired by the acceleration sensor 18 that has been determined to have an abnormality. The reason is as follows, as to why the generation of the control signal u0, based on the reference signal r acquired by the acceleration sensor 18 determined to have an abnormality, is stopped. That is, when the actuator 16 is driven using the control signal u0 based on the reference signal r acquired by the acceleration sensor 18 that has been determined to have an abnormality, the actuator 16 is driven using the inappropriate control signal u0. If the actuator 16 is driven with the inappropriate control signal u0, the noise cannot be reduced well. For this reason, in the present embodiment, generation of the control signal u0, based on the reference signal r acquired by the acceleration sensor 18 that has been determined to have an abnormality, is stopped.

When the determination unit 26 determines that an abnormality has occurred in any of the acceleration sensors 18, the control unit 28 further performs the following control. That is, in such a case, the control unit 28 stops updating the filter coefficient W of the adaptive filter 36 that performs the filtering process on the reference signal r acquired by the acceleration sensor 18 that has been determined to have no abnormality. The reason is as follows, as to why the update of the filter coefficient W of the adaptive filter 36 that performs the filtering process on the reference signal r acquired by the acceleration sensor 18 determined to have no abnormality, is stopped. That is, in the active noise control device 10 that performs control using the signals r detected by the plurality of acceleration sensors 18, the parameters are adjusted such that the noise reduction effect is acquired in each seat 13 in a balanced manner. For this reason, when the signal r acquired by any of the acceleration sensors 18 is missing, the balance is lost, and a phenomenon may occur in which noise is sufficiently reduced in a certain seat 13 while noise is increased in another seat 13. For this reason, in such a case, the control unit 28 stops updating the filter coefficient W of the adaptive filter 36 that performs the filtering process on the reference signal r acquired by the acceleration sensor 18 that has been determined to have no abnormality.

When it is determined that an abnormality has occurred in the acceleration sensor 18, the control unit 28 stores information indicating that an abnormality has occurred in the acceleration sensor 18 in the storage unit 30. The information indicating that an abnormality has occurred in the acceleration sensor 18 can be used for a failure diagnosis or the like, for example.

The output unit 32 notifies a failure diagnosis device 66 of information indicating that an abnormality has occurred in the acceleration sensor 18. When the failure diagnosis device 66 is connected to the vehicle 12, the control unit 28 supplies information indicating that an abnormality has occurred in the acceleration sensor 18, to the failure diagnosis device 66 via the output unit 32. Since the information indicating that an abnormality has occurred in the acceleration sensor 18 is supplied to the failure diagnosis device 66, the failure diagnosis device 66 can accurately perform a failure diagnosis.

When it is determined that an abnormality has occurred in the acceleration sensor 18, the control unit 28 outputs information indicating that an abnormality has occurred in the acceleration sensor 18 to an information display device 68 provided at the vehicle 12. The information display device 68 can display information indicating that an abnormality has occurred in the acceleration sensor 18. Since the information indicating that an abnormality has occurred in the acceleration sensor 18 can be displayed on the information display device 68, the user can notice that an abnormality has occurred in the acceleration sensor 18 based on the display of the information display device 68.

Figure 5:
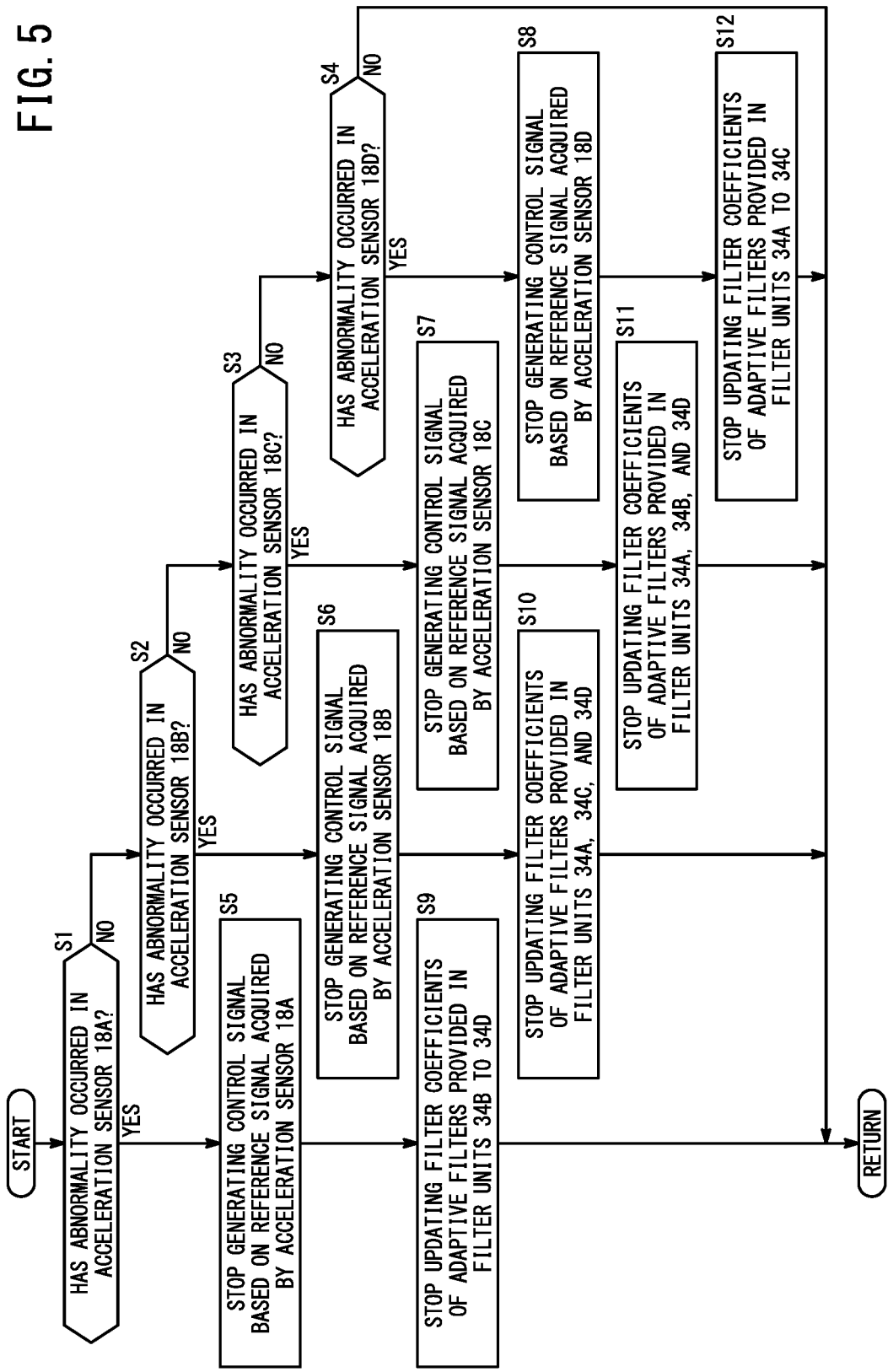
FIG. 5 is a flowchart illustrating an example of operations of an active noise control device according to an embodiment.

Next, an example of operations of the active noise control device according to the present embodiment will be described with reference to FIG. 5. FIG. 5 is a flowchart illustrating an example of operations of the active noise control device according to the present embodiment.

First, in step S1, the determination unit 26 determines whether or not an abnormality has occurred in the acceleration sensor 18A. When an abnormality has occurred in the acceleration sensor 18A (YES in step S1), the process transitions to step S5. If no abnormality has occurred in the acceleration sensor 18A (NO in step S1), the process transitions to step S2.

In step S2, the determination unit 26 determines whether or not an abnormality has occurred in the acceleration sensor 18B. When an abnormality has occurred in the acceleration sensor 18B (YES in step S2), the process transitions to step S6. If no abnormality has occurred in the acceleration sensor 18B (NO in step S2), the process transitions to step S3.

In step S3, the determination unit 26 determines whether or not an abnormality has occurred in the acceleration sensor 18C. When an abnormality has occurred in the acceleration sensor 18C (YES in step S3), the process transitions to step S7. If no abnormality has occurred in the acceleration sensor 18C (NO in step S3), the process transitions to step S4.

In step S4, the determination unit 26 determines whether or not an abnormality has occurred in the acceleration sensor 18D. When an abnormality has occurred in the acceleration sensor 18D (YES in step S4), the process transitions to step S8. If no abnormality has occurred in the acceleration sensor 18D (NO in step S4), the process illustrated in FIG. 5 is completed.

In step S5, the control unit 28 stops generating the control signal u0 based on the reference signal r acquired by the acceleration sensor 18A. Thereafter, the process transitions to step S9.

In step S6, the control unit 28 stops generating the control signal u0 based on the reference signal r acquired by the acceleration sensor 18B. Thereafter, the process transitions to step S10.

In step S7, the control unit 28 stops generating the control signal u0 based on the reference signal r acquired by the acceleration sensor 18C. Thereafter, the process proceeds to step S11.

In step S8, the control unit 28 stops generating the control signal u0 based on the reference signal r acquired by the acceleration sensor 18D. Thereafter, the process proceeds to step S12.

In step S9, the control unit 28 stops updating the filter coefficients W of the adaptive filters 36 that perform the filtering processes on the reference signals r acquired by the acceleration sensors 18B to 18D. That is, the update of the filter coefficients W of the adaptive filters 36 provided in the filter units 34B to 34D is stopped. Upon completion of step S9, the process illustrated in FIG. 5 is brought to an end.

In step S10, the control unit 28 stops updating the filter coefficients W of the adaptive filters 36 that perform the filtering processes on the reference signals r acquired by the acceleration sensors 18A, 18C, and 18D. That is, the update of the filter coefficients W of the adaptive filters 36 provided in the filter units 34A, 34C, and 34D is stopped. Upon completion of step S10, the process illustrated in FIG. 5 is brought to an end.

In step S11, the control unit 28 stops updating the filter coefficients W of the adaptive filters 36 that perform the filtering processes on the reference signals r acquired by the acceleration sensors 18A, 18B, and 18D. That is, the update of the filter coefficients W of the adaptive filters 36 provided in the filter units 34A, 34B, and 34D is stopped. Upon completion of step S11, the process illustrated in FIG. 5 is brought to an end.

In step S12, the control unit 28 stops updating the filter coefficients W of the adaptive filters 36 that perform the filtering processes on the reference signals r acquired by the acceleration sensors 18A to 18C. That is, the update of the filter coefficients W of the adaptive filters 36 provided in the filter units 34A to 34C is stopped. Upon completion of step S12, the process illustrated in FIG. 5 is brought to an end.

Figure 6:
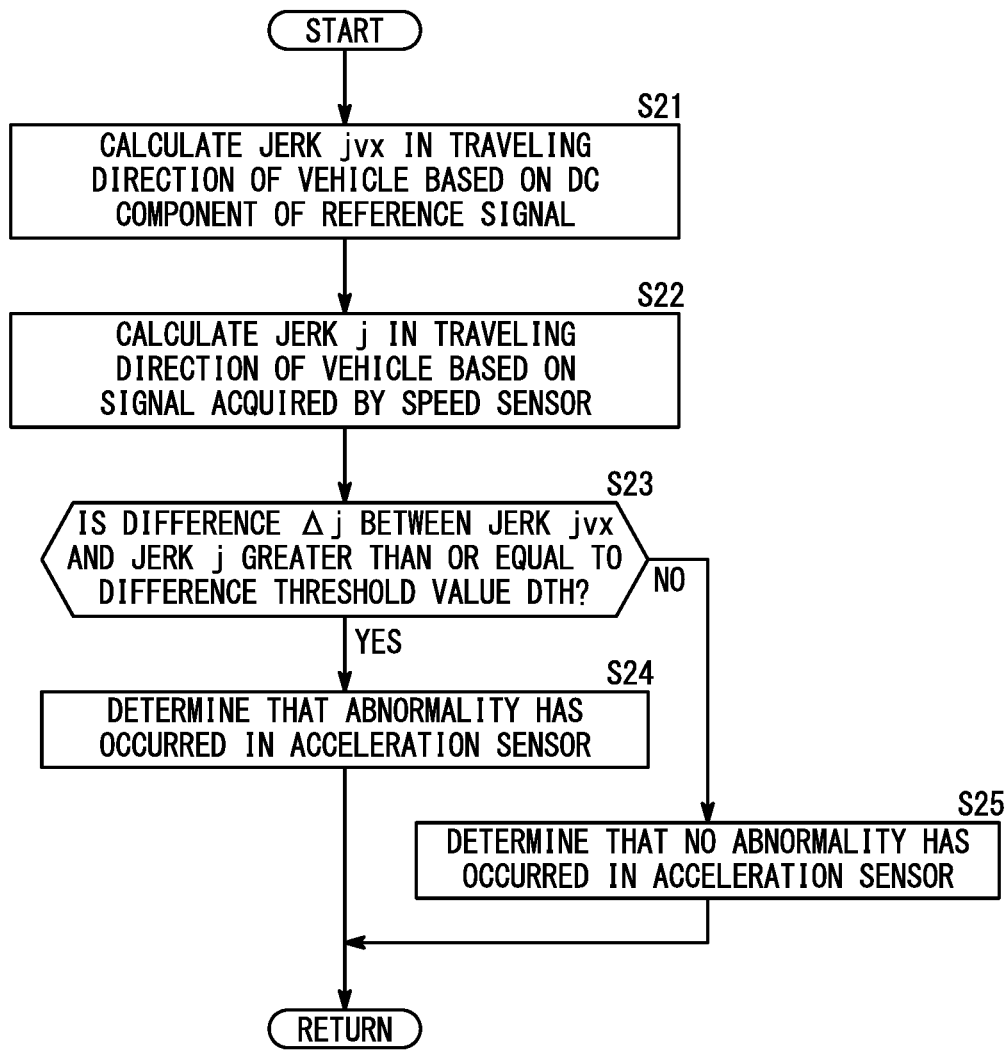
FIG. 6 is a flowchart illustrating an example of operations of an active noise control device according to an embodiment.

Next, an example of operations of the active noise control device according to the present embodiment will be described with reference to FIG. 6. FIG. 6 is a flowchart illustrating an example of operations of the active noise control device according to the present embodiment.

In step S21, the first calculating unit 46 calculates the jerk jvx in the traveling direction of the vehicle 12 based on the DC component of the reference signal r.

In step S22, the second calculating unit 48 calculates the jerk j in the traveling direction of the vehicle 12 based on the signal acquired by the speed sensor 19 provided at the vehicle 12. That is, the second calculating unit 48 calculates the jerk j in the traveling direction of the vehicle 12 based on the signal indicating the speed v.

In step S23, the determination unit 26 determines whether or not the difference Δj between the jerk jvx calculated by the first calculating unit 46 and the jerk j calculated by the second calculating unit 48 is greater than or equal to the difference threshold value DTH. When the difference Δj is greater than or equal to the difference threshold value DTH (YES in step S23), the process proceeds to step S24. When the difference Δj is less than the difference threshold value DTH (NO in step S23), the process proceeds to step S25.

In step S24, the determination unit 26 determines that an abnormality has occurred in the acceleration sensor 18.

In step S25, the determination unit 26 determines that no abnormality has occurred in the acceleration sensor 18. Thus, the processing illustrated in FIG. 6 is completed.

Figure 7:
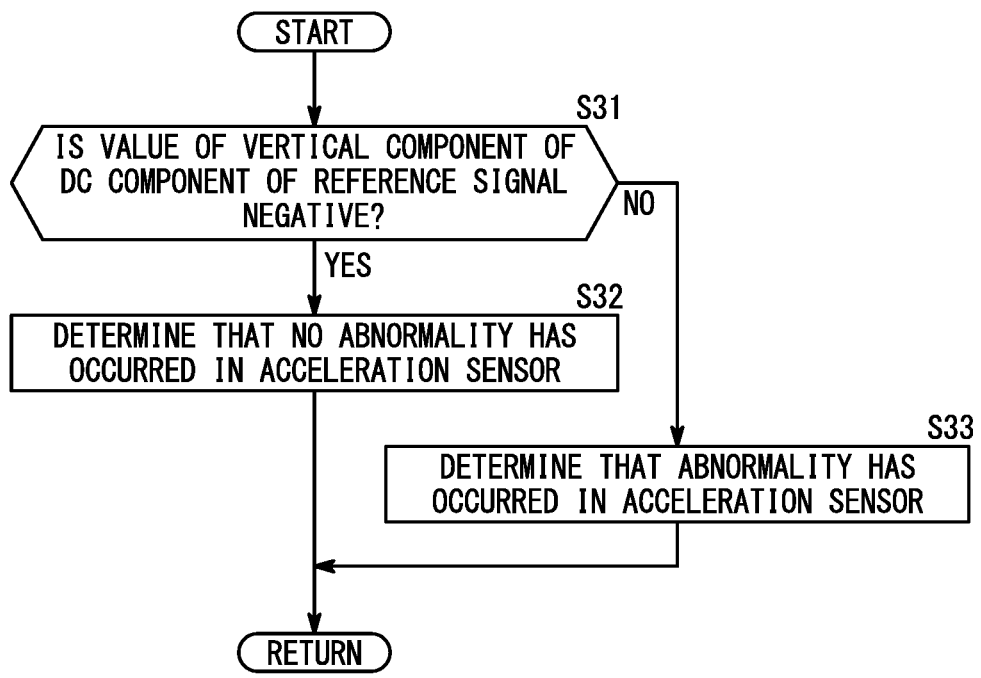
FIG. 7 is a flowchart illustrating an example of operations of an active noise control device according to an embodiment.

Next, an example of operations of the active noise control device according to the present embodiment will be described with reference to FIG. 7. FIG. 7 is a flowchart illustrating an example of operations of the active noise control device according to the present embodiment. Here, an example is described of a case where a normal condition is defined as the vertical component of the DC component of the reference signal r being negative, and an abnormal condition is defined as the vertical component of the DC component of the reference signal r being positive.

In step S31, the determination unit 26 determines whether or not the value of the vertical component of the DC component of the reference signal r is negative. When the value of the vertical component of the DC component of the reference signal r is negative (YES in step S31), the process transitions to step S32. When the value of the vertical component of the DC component of the reference signal r is positive (NO in step S31), the process transitions to step S33.

In step S32, the determination unit 26 determines that no abnormality has occurred in the acceleration sensor 18.

In step S33, the determination unit 26 determines that an abnormality has occurred in the acceleration sensor 18. Accordingly, the process illustrated in FIG. 7 is brought to an end.

As described above, in the present embodiment, when the determination unit 26 determines that an abnormality has occurred in any of the plurality of acceleration sensors 18, generation of the control signal u0, based on the reference signal r acquired by the acceleration sensor 18 that has been determined to have an abnormality, is stopped. Further, in the present embodiment, the update of the filter coefficient W of the adaptive filter 36 that performs the filtering process on the reference signal r acquired by the acceleration sensor 18 that has been determined to have no abnormality, is stopped. For this reason, according to the present embodiment, even in a case where an abnormality has occurred in any of the plurality of acceleration sensors 18, it is possible to provide the active noise control device 10 that is capable of suppressing an adverse effect due to the acceleration sensor 18 in which the abnormality has occurred, and thus it is possible to provide the active noise control device 10 that is capable of reducing noise suitably.

Although preferred embodiments of the present invention have been described above, the present invention is not limited to the above-described embodiments, and various modifications can be made thereto without departing from the essence and gist of the present invention.

The above-described embodiments can be summarized in the following manner.

The active noise control device (10) causes the actuator (16) to output the canceling sound based on the control signal (u) in order to reduce noise in the vehicle compartment (14) of the vehicle (12). The active noise control device includes the adaptive filter (36X to 36Z) configured to generate the control signal by performing the filtering process on the reference signal (rx to rz) acquired by the acceleration sensor (18A to 18D) attached to the vehicle, the filter coefficient updating unit (40X to 40Z) configured to update the filter coefficient (W) of the adaptive filter based on the reference signal and the error signal (e) acquired by detecting residual noise due to interference between the noise and the canceling sound by the microphone (20), the determination unit (26) configured to determine whether an abnormality has occurred in the acceleration sensor based on the direct-current component of the reference signal, and the control unit (28) configured to, when the determination unit determines that an abnormality has occurred in any of the plurality of the acceleration sensors, stop generation of the control signal based on the reference signal acquired by the acceleration sensor that has been determined to have the abnormality, and stop updating the filter coefficient of the adaptive filter configured to perform the filtering process on the reference signal acquired by the acceleration sensor that has been determined to have no abnormality. According to such a configuration, even when an abnormality has occurred in any of the plurality of acceleration sensors, it is possible to provide an active noise control device that is capable of suppressing an adverse effect due to the acceleration sensor in which the abnormality has occurred, and thus it is possible to provide an active noise control device that is capable of reducing noise suitably.

The active noise control device may further include the first calculating unit (46) configured to calculate the jerk (jvx) in a traveling direction of the vehicle based on the direct-current component of the reference signal, and the second calculating unit (48) configured to calculate the jerk (j) in the traveling direction of the vehicle based on the signal (v) acquired by the speed sensor (19) provided at the vehicle, wherein the determination unit may be configured to determine that the abnormality has occurred in the acceleration sensor when a difference (Δj) between the jerk calculated by the first calculating unit and the jerk calculated by the second calculating unit is greater than or equal to the difference threshold value (DTH). According to such a configuration, since the determination is performed using the jerk, even when an acceleration sensor having relatively low acceleration detection accuracy is provided at the vehicle, it is possible to suitably determine whether or not an abnormality has occurred in the acceleration sensor.

The positive or negative sign of a value of a vertical component of the direct-current component of the reference signal may differ between a case where the acceleration sensor is normally attached to the vehicle and a case where the acceleration sensor is not normally attached to the vehicle, and the determination unit may be configured to determine whether or not the abnormality has occurred in the acceleration sensor based on the positive or negative sign of the vertical component. According to such a configuration, even when an abnormality (attachment abnormality) occurs in which the acceleration sensor is attached with the front and back reversed, such an abnormality can be accurately determined.

In a case where it is determined that the abnormality has occurred in the acceleration sensor, the control unit may be configured to store information indicating that the abnormality has occurred in the acceleration sensor in the storage unit (30). According to such a configuration, information indicating that an abnormality has occurred in the acceleration sensor can be used for a failure diagnosis or the like.

The active noise control device may further includes the output unit (32) configured to notify the failure diagnosis device (66) of information indicating that the abnormality has occurred in the acceleration sensor. According to such a configuration, since information indicating that an abnormality has occurred in the acceleration sensor can be supplied to the failure diagnosis device, an accurate failure diagnosis can be performed by the failure diagnosis device.

In a case where it is determined that the abnormality has occurred in the acceleration sensor, the control unit may be configured to output information indicating that the abnormality has occurred in the acceleration sensor to the information display device (68) provided at the vehicle. According to such a configuration, since the information indicating that an abnormality has occurred in the acceleration sensor can be displayed on the information display device, the user can notice that an abnormality has occurred in the acceleration sensor based on the display of the information display device.

The acceleration sensor may be a three-axis acceleration sensor.

The vehicle includes the active noise control device as described above.

What is claimed is:

1. An active noise control device that causes an actuator to output a canceling sound based on a control signal in order to reduce noise in a vehicle compartment of a vehicle, the active noise control device comprising one or more processors that execute computer-executable instructions stored in a memory, wherein the one or more processors execute the computer-executable instructions to cause the active noise control device to:
   generate the control signal by performing a filtering process with an adaptive filter on a reference signal acquired by an acceleration sensor attached to the vehicle;
   update a filter coefficient of the adaptive filter based on the reference signal and an error signal acquired by detecting residual noise due to interference between the noise and the canceling sound by a microphone;
   determine whether an abnormality has occurred in the acceleration sensor based on a direct-current component of the reference signal; and
   when it is determined that an abnormality has occurred in any of a plurality of the acceleration sensors, stop generation of the control signal based on the reference signal acquired by the acceleration sensor that has been determined to have the abnormality, and stop updating the filter coefficient of the adaptive filter configured to perform the filtering process on the reference signal acquired by the acceleration sensor that has been determined to have no abnormality.

2. The active noise control device according to claim 1, wherein the one or more processors cause the active noise control device to:
   calculate a jerk in a traveling direction of the vehicle by a first calculating unit, based on the direct-current component of the reference signal;
   calculate a jerk in the traveling direction of the vehicle by a second calculating unit, based on a signal acquired by a speed sensor provided at the vehicle; and
   determine that the abnormality has occurred in the acceleration sensor when a difference between the jerk calculated by the first calculating unit and the jerk calculated by the second calculating unit is greater than or equal to a difference threshold value.

3. The active noise control device according to claim 1, wherein a positive or negative sign of a value of a vertical component of the direct-current component of the reference signal differs between a case where the acceleration sensor is normally attached to the vehicle and a case where the acceleration sensor is not normally attached to the vehicle, and
   the one or more processors cause the active noise control device to determine whether or not the abnormality has occurred in the acceleration sensor based on the positive or negative sign of the vertical component.

4. The active noise control device according to claim 1, wherein in a case where it is determined that the abnormality has occurred in the acceleration sensor, the one or more processors cause the active noise control device to store information indicating that the abnormality has occurred in the acceleration sensor in a storage unit.

5. The active noise control device according to claim 1, wherein the one or more processors cause the active noise control device to notify a failure diagnosis device of information indicating that the abnormality has occurred in the acceleration sensor.

6. The active noise control device according to claim 1, wherein in a case where it is determined that the abnormality has occurred in the acceleration sensor, the one or more processors cause the active noise control device to output information indicating that the abnormality has occurred in the acceleration sensor to an information display device provided at the vehicle.

7. The active noise control device according to claim 1, wherein each of the acceleration sensors is a three-axis acceleration sensor.

8. A vehicle comprising an active noise control device that causes an actuator to output a canceling sound based on a control signal in order to reduce noise in a vehicle compartment of the vehicle, the active noise control device comprising one or more processors that execute computer-executable instructions stored in a memory, wherein the one or more processors execute the computer-executable instructions to cause the active noise control device to:
   generate the control signal by performing a filtering process with an adaptive filter on a reference signal acquired by an acceleration sensor attached to the vehicle;
   update a filter coefficient of the adaptive filter based on the reference signal and an error signal acquired by detecting residual noise due to interference between the noise and the canceling sound by a microphone;
   determine whether an abnormality has occurred in the acceleration sensor based on a direct-current component of the reference signal; and
   when it is determined that an abnormality has occurred in any of a plurality of the acceleration sensors, stop generation of the control signal based on the reference signal acquired by the acceleration sensor that has been determined to have the abnormality, and stop updating the filter coefficient of the adaptive filter configured to perform the filtering process on the reference signal acquired by the acceleration sensor that has been determined to have no abnormality.

* * * * *